United States Patent
Pursiheimo

(10) Patent No.: US 6,582,147 B1
(45) Date of Patent: Jun. 24, 2003

(54) ADJUSTMENT JOINT, FASTENING ELEMENTS AND METHOD FOR INSTALLATION AND POSITION SETTING USING AN ADJUSTMENT JOINT

(75) Inventor: Juhani Pursiheimo, Helsinki (FI)

(73) Assignee: Nokia Corporation, Helsinki (FI)

( * ) Notice: Subject to any disclaimer, the term of this patent is extended or adjusted under 35 U.S.C. 154(b) by 0 days.

(21) Appl. No.: 09/870,000

(22) PCT Filed: Jan. 20, 2000

(86) PCT No.: PCT/FI00/00043
§ 371 (c)(1),
(2), (4) Date: Jul. 10, 2001

(87) PCT Pub. No.: WO00/44063
PCT Pub. Date: Jul. 27, 2000

(30) Foreign Application Priority Data

Jan. 20, 1999 (FI) .................................................. 990108

(51) Int. Cl.$^7$ ............................................. H01R 13/00
(52) U.S. Cl. ......................................... 403/97; 403/98
(58) Field of Search ................ 403/97, 98; 248/292.12, 248/278.1

(56) References Cited

U.S. PATENT DOCUMENTS

| | | |
|---|---|---|
| 4,235,556 A | 11/1980 | Dewey et al. |
| 4,612,551 A | 9/1986 | Dreyer |
| 5,103,236 A | 4/1992 | DuShane |
| 5,226,622 A | 7/1993 | LeAnna |
| 5,383,637 A | 1/1995 | Biber |
| 5,529,358 A * | 6/1996 | Dinkler et al. ................ 403/97 |
| 5,547,305 A * | 8/1996 | Treche ..................... 403/97 X |
| 6,079,682 A * | 6/2000 | Olkkola ................... 248/278.1 |

FOREIGN PATENT DOCUMENTS

WO    WO 98/44584    10/1998

* cited by examiner

Primary Examiner—Lynne H. Browne
Assistant Examiner—John R. Cottingham
(74) Attorney, Agent, or Firm—Cohen, Pontani, Lieberman & Pavane

(57) ABSTRACT

The invention relates to an adjustment joint for adjusting position, which adjustment joint (S1, S2) comprises at least two adjustment parts (S11, S12, S13, S21, S22, S23) adapted so as to be rotatable with respect to each other around (arrow R) a joint axis (A1, A2), and a locking element (S14, S15, S15a, S15b, S15c, S15d) functioning in the direction (arrow L) of said joint axis (A1, A2) for locking the adjustment parts (S11, S12, S13, S21, S22, S23) so that they become immobile with respect to each other. According to the invention, the adjustment joint (S1, S2) is adapted so as to be switched from the locked state to a fine adjustment mode by opening the locking element (S14, S15, S15a, S15b, S15c, S15d), which fine adjustment mode is arranged for preferably stepless fine adjustment of position. The adjustment joint (S1, S2) is adapted so as to be switched from the fine adjustment mode to a coarse adjustment mode by further opening the locking element (S14, S15, S15a, S15b, S15c, S15d), which coarse adjustment mode is arranged for preferably stepped coarse adjustment of position. The adjustment joint (S1, S2) is adapted so as to be switched from the coarse adjustment mode back to the fine adjustment mode and further from the fine adjustment mode to the locked state by tightening the locking element (S14, S15, S15a, S15b, S15c, S15d).

29 Claims, 5 Drawing Sheets

ADJUSTMENT JOINT, FASTENING ELEMENTS AND METHOD FOR INSTALLATION AND POSITION SETTING USING AN ADJUSTMENT JOINT

PRIORITY CLAIM

This is a national stage of PCT application No. PCT/FI00/00043, filed on Jan. 20, 2000. Priority is claimed on that application and on patent application Ser. No. 990108, filed in Finland on Jan. 20, 1999.

FILED OF THE INVENTION

The present invention relates to an adjustment joint for adjusting position. The invention also relates to fastening elements for fastening objects and setting positions. In addition, the invention relates to a method for installation and position setting using an adjustment joint.

BACKGROUND OF THE INVENTION

It is known to use permanent and semipermanent radio links in order to facilitate a typically bi-directional radio connection. Radio links relay telephone and data traffic as well as radio and TV signals between stations. The radio link is realized by means of electromagnetic radiation, i.e. radio waves, and the frequency of radio waves in a radio link may range from the RF wave band to the microwave region. Links may be 40 to 50 km long, in which case the link masts are typically 40 to 60 meters tall. Link antennas attached to the masts may be parabolic antennas, for example. Typically, there is a line-of-sight path between the radio link antennas so that radio wave propagation is free.

A known wireless transmission system for telephone and data traffic is the cellular-based public land mobile network (PLMN), such as GSM network, which facilitates wireless communication between a mobile station (MS), such as a mobile phone, and fixed parts of the system while the user of the mobile station moves in the system's operating area. The radio links between the fixed parts of the system are typically a few kilometers or even shorter, whereby the types and sizes of the antennas used may vary. They may be e.g. antennas attached to masts or walls of buildings that are aimed at their targets, say at an antenna attached to another mast. As a general rule, cell sizes are becoming smaller, which will partly result in a growing number of radio links and, hence, more antenna installations and modifications.

Antennas are used to transmit and receive radio waves. An antenna does not radiate in the same way in all directions but its characteristics may be represented by a radiation pattern which describes the correlation between e.g. the field strength radiated by the antenna and the direction. Indeed many antennas radiate strongly in one direction only, whereby the radiation pattern of such an antenna usually has one main lobe and, in addition to that, weaker side lobes. The radiation pattern is an important factor in antenna design, and radio link antennas are normally very directional, i.e. the direction of the main lobe is both vertically and horizontally narrow. It is then obvious that such an antenna has to be aimed at another, receiving, antenna carefully and with adequate precision.

In the prior art, the aiming of a radio link antenna, for example, has been carried out in such a manner that the field strength of the antenna is measured with a so-called AGC voltmeter. Naturally the measurement has to take place at the target, say at the other end of the radio link, at which the antenna is aimed, and advantageously at the location in which the other antenna is to be, or has already been, mounted. Aiming is carried out in such a manner that first the antenna is pointed to the rough direction of its target, using e.g. a compass, after which the antenna is mechanically turned using its fastening or adjustment means, such as adjustment screws. At the same time the field strength is measured with the voltmeter, and by mechanically turning the antenna one attempts to find the field strength maximum both vertically and horizontally. Thus the main lobe of the antenna is aimed at its target and the antenna can be locked in its position.

Antenna fastening elements typically comprise several lockings, joints and lockable adjustment rods and similar elements for performing in addition to the actual fastening, coarse and fine adjustment in conjunction with the aiming. There are several work stages and typically several screws have to be removed and screwed back on in connection with the aiming. A joint used with the fastening elements typically comprises two joint portions that can be rotated with respect to each other and that are locked in their places by tightening a bolt functioning as an axle. Such a joint is suitable only for coarse adjustment. It may also be that there are no adjustment elements and joints as mentioned above, in which case the antenna must be aimed at its target simultaneously with the fastening, in conjunction with the installation. Typically, antennas are heavy, about 5 to 10 kg, so the fastening elements and adjustment elements tend to be large and difficult to handle.

With decreasing cell sizes also the radio link antenna sizes are becoming smaller and the antennas may typically weigh about 3 kg. Current fastening elements are rather unsuitable for small antennas e.g. because they do not have a sufficient adjustment range, they are very difficult to use for fine adjustment, and they are too large to be inconspicuously installed in urban surroundings. The adjustment range of known fastening elements is typically $\pm 25$–$45°$ in the vertical plane and up to $\pm 180°$ in the horizontal plane.

SUMMARY OF THE INVENTION

An object of the present invention is to eliminate the aforementioned problems of the prior art and to provide an adjustment joint with a wide adjustment range for the purpose of aiming, for example. In particular, it is an object of the invention to provide an adjustment joint such that the adjustment joint can be switched from a coarse adjustment mode, fine adjustment mode or locking mode to another one of these modes in a very simple manner just by tightening or loosening the locking means of the adjustment joint, which makes both the installation and the structure of the fastening elements considerably simpler.

A considerable advantage of the invention is that when aiming an antenna one has to tighten or loosen only one locking mechanism fitted to the adjustment joint. Another advantage of the invention is that by means of two adjustment joints according to the invention the aiming can be carried out for a wide adjustment range in both the horizontal and vertical plane.

The invention is used to make the aiming of antennas significantly more accurate, quicker and simpler than in the prior art. A special advantage of the invention is the wide adjustment range, advantageously $180°$ in the vertical plane and $360°$ in the horizontal plane. Another special advantage of the invention is the adequate adjustment range for fine adjustment, advantageously about $10°$, as well as the adequate aiming accuracy, advantageously about $\pm 0.25°$, facilitated by the structure. A further advantage of the invention is the small size, whereby a fastening element according to a preferred embodiment of the invention weighs about 2 kg.

BRIEF DESCRIPTION OF THE DRAWINGS

The invention will now be described in more detail with reference to the accompanying drawings wherein.

DETAILED DESCRIPTION OF THE PRESENTLY PREFERRED EMBODIMENTS

Figure 1:
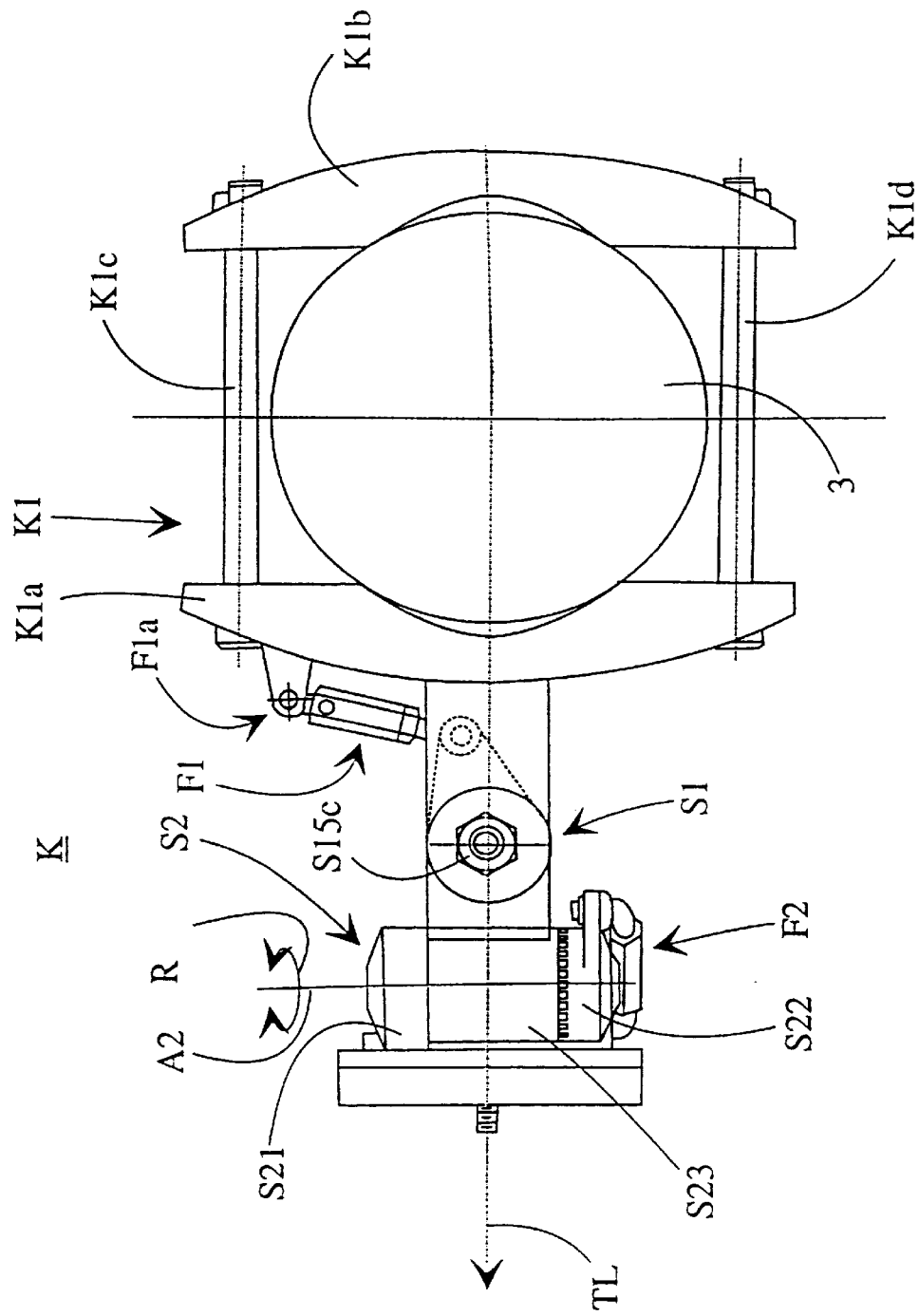
FIG. 1 is an overhead view of two adjustment joints according to a first preferred embodiment of the invention applied in connection with fastening elements.
Figure 2:
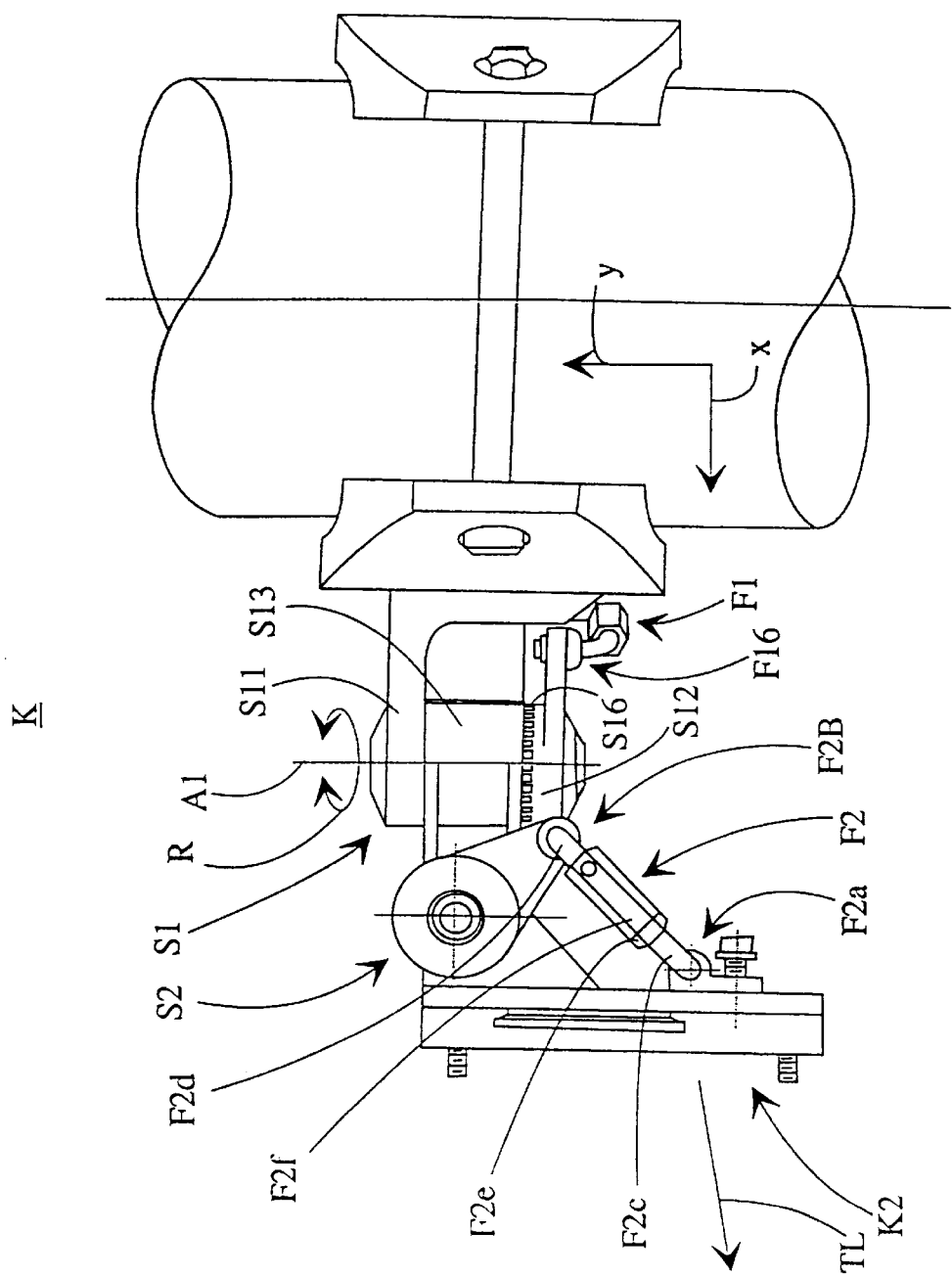
FIG. 2 is a side view of the fastening elements of FIG. 1.

Referring to FIGS. 1 and 2, the fastening elements K, in connection with which the adjustment joints S1 and S2 according to the invention are applied, comprise fastening parts K1 for attachment e.g. to a bar, mast, beam or the like 3. When attaching to a wall, parts K1b, K1c and K1d are omitted. The fastening elements K depicted are adapted so as to attach an object (not shown), particularly and antenna, and to adjust its position. In the example described the bar 3 is vertical (arrow Y) but it is obvious that other positions, too, are possible. In addition, the fastening parts K1 may comprise lockable articulations by means of which it is possible to alter the position of the fastening elements K relative to the bar 3. A first fastening part K1a and a second fastening part K1b are interconnected by fastening bolts K1c and K1d by means of which the fastening parts K1a and K1b press between them the bar 3. The fastening elements K further comprise a first adjustment joint S1 according to a first preferred embodiment of the invention and a first fine adjustment element F1, known as such, for the fine adjustment in the horizontal plane (arrow X). In addition, the fastening elements K comprise an adjustment joint S2 according to the first preferred embodiment of the invention and a first fine adjustment element F2, known as such, for the fine adjustment in the vertical plane (arrow Y). The detailed structure of the fine adjustment elements F1 an F2 may vary in different fastening elements K. The purpose of the fastening elements K is to provide a movable and lockable articulation for altering the position of the antenna attachment K2, such as mounting flange K2, in relation to the fastening parts K1. It is obvious that the fine adjustment element F1 and adjustment joint S1 may be left out, in which case the position of the mounting flange K2 is altered, when necessary, by altering the attachment position of the fastening parts K1 and by the adjustment joint S2. Both the fine adjustment elements F1 and F2 and adjustment joints S1 and S2 are advantageously used to change and lock the antenna position without opening the fastening parts K1. The aim of the TL depicted in FIG. 2 corresponds to the direction of the main lobe of an antenna (not shown) attached to the mounting flange K2.

Still referring to FIGS. 1 and 2, a first end F1a of the fine adjustment element F1 is fitted in an articulated manner to the fastening part K1a and a second end F1b is fitted in an articulated manner to the second adjustment part S12 of the adjustment joint S1. Correspondingly, a first end F2a of the fine adjustment element F2 is fitted in an articulated manner to the mounting flange K2 and a second end F2b is fitted in an articulated manner to the second adjustment part S22 of the adjustment joint S2. In addition, the first adjustment part S11 of the adjustment joint S1 is attached in a fixed manner to the fastening part K1a and the first adjustment part S21 of the adjustment joint S2 is attached in a fixed manner to the mounting flange K2. Thus it is possible by means of the fine adjustment element F1 (and, correspondingly, fine adjustment element F2) to rotate the first adjustment part S11 and second adjustment part S12 around (arrow R) the joint axis A1 (and, correspondingly, joint axis A2) traveling through the adjustment joint S1. The rotation is performed using the fine adjustment element F1 in the fine adjustment mode of adjustment joint S1 described later on. In this case the rotation is carried out by increasing or decreasing the length of the fine adjustment element F1 by screwing, whereby the distance between the ends F1a and F1b becomes either longer or shorter. This is arranged e.g. in the fine adjustment element F2 by means of adjustment rods F2c and F2d and locking bolts F2e and F2f, for example. A third adjustment part S13 of the adjustment joint S1 and a third adjustment part S23 of the adjustment joint S2 are attached to each other in a fixed manner, providing a so-called universal joint. Let it be mentioned that in FIGS. 1 and 2 the adjustment joints S1 and S2 are shown locked and the joint axes A1 and A2 are adapted so as to be perpendicular in relation to each other. In the coarse adjustment mode the third adjustment part S13 (and, correspondingly, adjustment part S23) may be moved by hand, for example.

Figure 3:
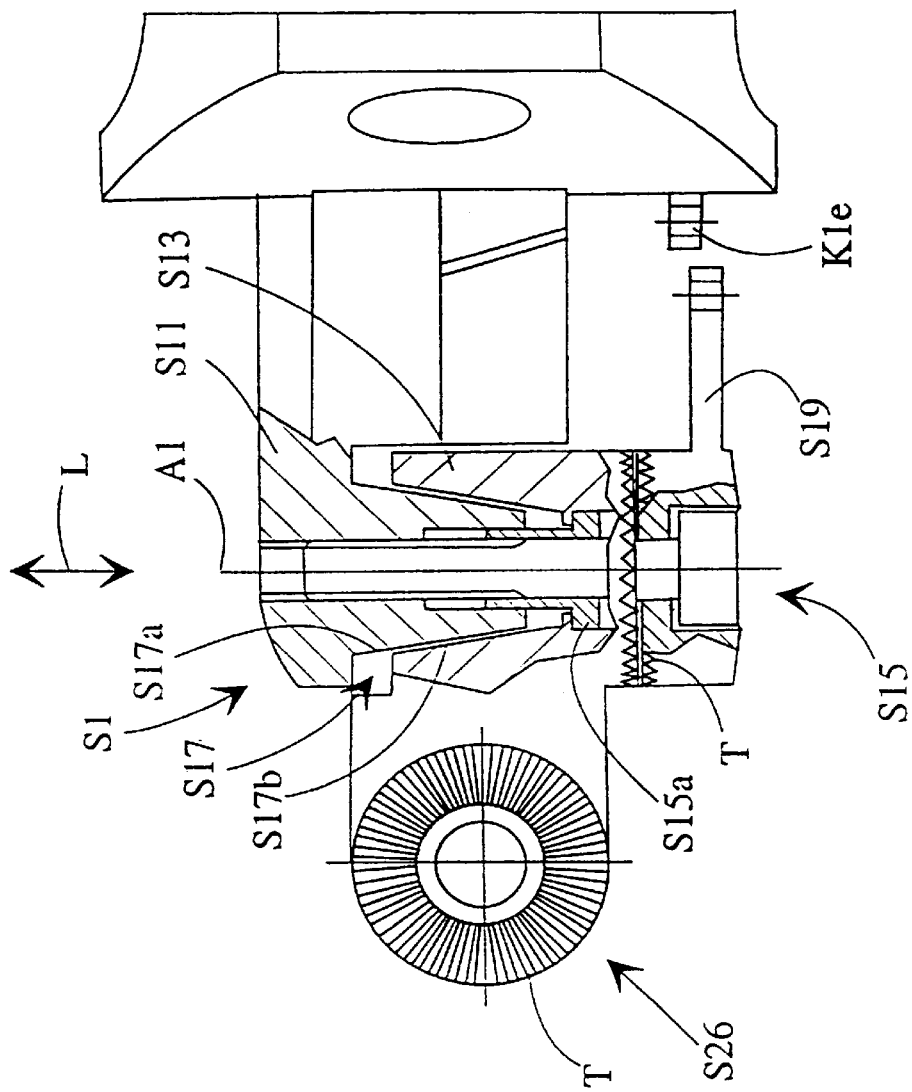
FIG. 3 is a partially cut out side view of an adjustment joint according to a second embodiment of the invention applied in connection with fastening elements in the coarse adjustment mode.
Figure 4:
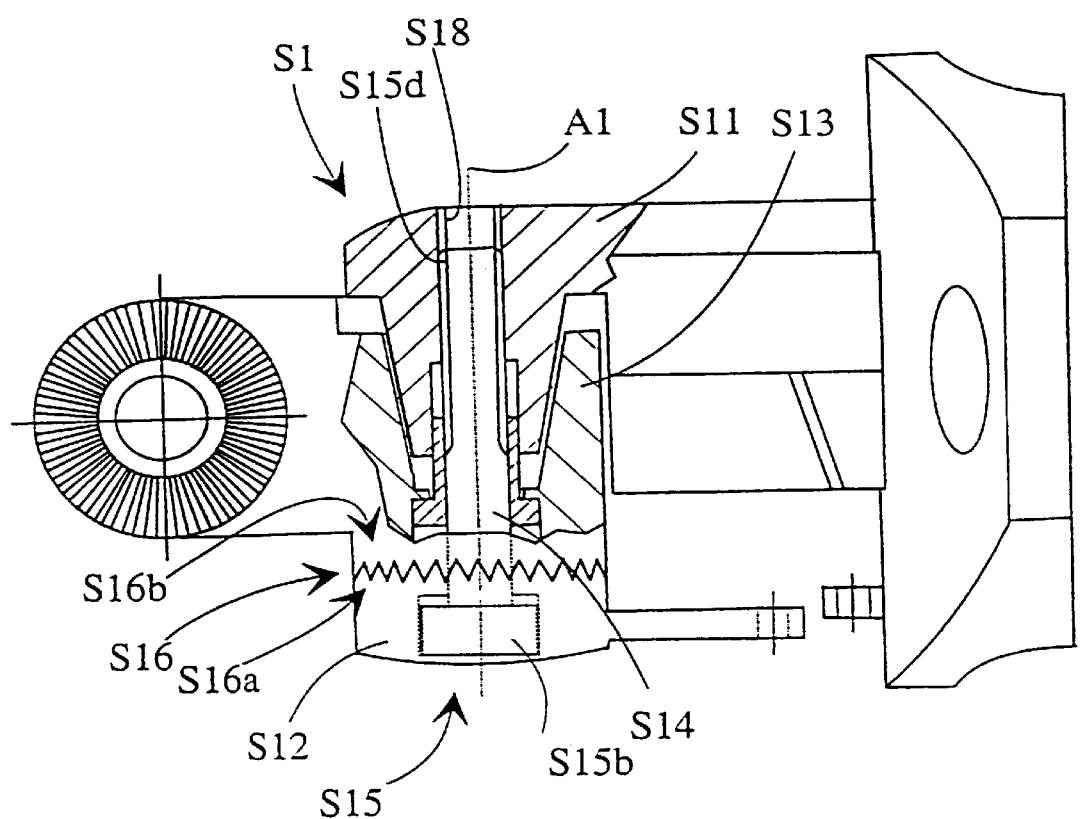
FIG. 4 shows the adjustment joint of FIG. 3 in the fine adjustment mode.
Figure 5:
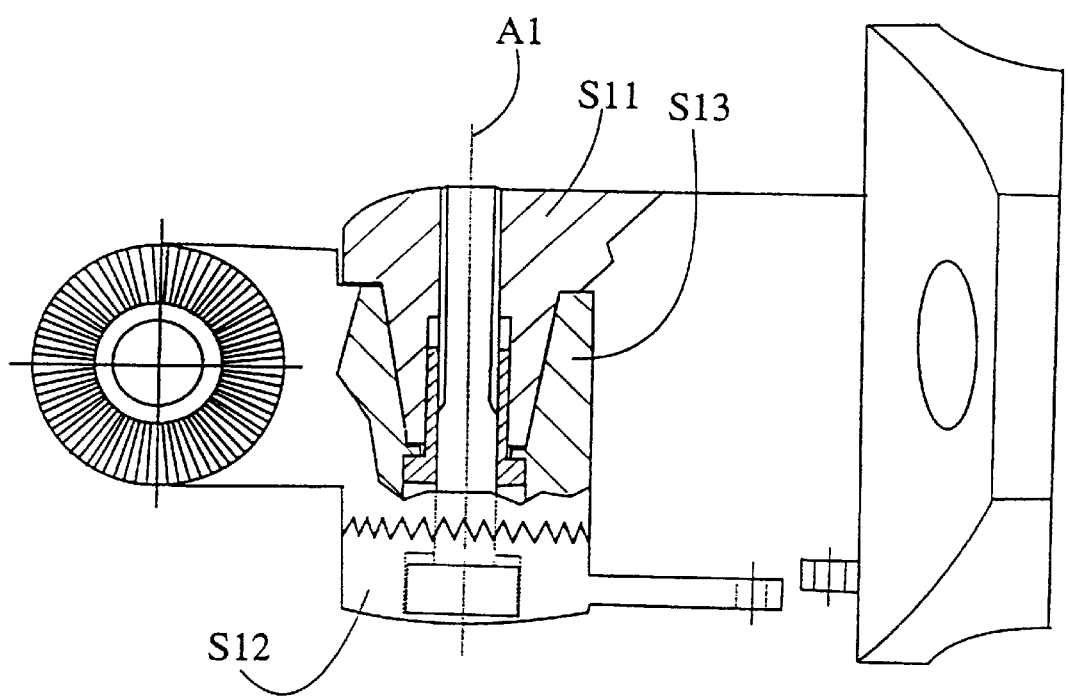
FIG. 5 shows the adjustment joint of FIG. 3 locked.

FIGS. 3 to 5 show an adjustment joint S1 according to a second preferred embodiment of the invention in different modes and partly cut open for illustrative purposes. In FIG. 3 the adjustment joint S1 is shown in the coarse adjustment mode, in which the third adjustment part S13 can be rotated in relation to the first adjustment part S11 around the joint axis A1, whereby the stepped adjustment range may be as wide as ±180° in the horizontal plane. In FIG. 4 the adjustment joint S1 is shown in the fine adjustment mode in which the third adjustment part S13 can be steplessly rotated in relation to the first adjustment part S11 around the joint axis A1, whereby the adjustment range depends on the adjustment range of the fine adjustment element F1 depicted in FIGS. 1 and 2. Advantageously, the adjustment range is arranged in accordance with FIG. 3 so that in the coarse adjustment mode the mutual position of the adjustment parts S12 and S13 can be set in steps of 5° and in the fine adjustment mode the position can be additionally altered steplessly by ±10°. An angle in this description means the angle of rotation (arrow R in FIG. 3) of an adjustment part e.g. around the joint axis A1 in relation to another adjustment part. In FIG. 5 the adjustment parts S11, S12 and S13 are locked, advantageously pressed against each other by a locking element S15 so that rotary movement between them is prevented by means of friction, among other things.

Switching between modes is realized by tightening or loosening the adjustment joint S1 by means of a locking element S15, advantageously a locking bolt S15, whereby the movement of particularly the third adjustment part S13 in the adjustment joint S1 is restricted in the direction of the joint axis A1 (arrow L). Said locking element S15 thus functions in the direction of the axis A1. In the coarse adjustment mode the directional movement of the third adjustment part S13 in the direction of the joint axis A1 and rotary movement around the joint axis A1 are allowed, whereas in the fine adjustment mode the rotary movement and advantageously also the directional movement relative to the second adjustment part S12 are substantially prevented. The directional movement is prevented in such a manner that the third adjustment part S13 is, in accordance with FIG. 4, in sliding contact with the first adjustment part S11, and the locking element S15 is tightened such that sliding is possible, but the rotation of the third adjustment part S13 to the next step of the cogging S16 is prevented as there is no room for the third adjustment element S13 to move in the direction of the joint axis A1. In the coarse adjustment, the second adjustment part S12 and third adjustment part S13 can be stepwise brought into contact with each other, and in a suitable position the locking element S15 is tightened so as to keep the desired position. In the locked position, the adjustment elements S11 and S13 are tightened against each other so that friction prevents them from moving in relation to each other around the joint axis A1. The first cogging S16a of the gear S16 is located in the adjustment part S12 and the second cogging S16b is located in the adjustment part S13.

Referring to FIGS. 1 to 5, the first adjustment part S11 and third adjustment part S13 are interconnected by a cone joint S17, in which the male cone S17a is fitted to the adjustment part S11 and the female cone S17b is fitted to the adjustment part S13 symmetrically with respect to the joint axis A1. In the second preferred embodiment of the adjustment joint S1 the second and third adjustment parts S12 and S13 are interconnected by a gear of conical cogs S16, as shown in FIGS. 3 to 5. In the first preferred embodiment of the adjustment joint S1 the second and third adjustment parts S12 and S13 are interconnected by a gear of substantially rectangular cogs S16, as shown in FIGS. 1 to 2. It is obvious that the cogs S16 may as well be curved, for instance. Advantageously the cogs S16 are rectangular, as in FIGS. 1 and 2, so that a short mutual movement of adjustment parts S12 and S13 is allowed in the direction of the joint axis A1 but at the same time their mutual rotary movement around the joint axis A1 is prevented substantially completely, for their mutual rotary movement would degrade the accuracy of fine adjustment. The short movement allowed in the direction of the axis A1 is however arranged in such a manner that a movement of adjustment part S13 over the cogs S16a is prevented by bringing the male cone S17a sufficiently close to the female cone S17b. Said short movement is then preferably shorter than the height of the cogging S16a and S16b in the direction of the joint axis A1.

The locking element S15 advantageously comprises simply a locking bolt S15 which in the first preferred embodiment of the adjustment joint S1 is arranged so as to lock the adjustment joint S1 by means of a nut S15c, as shown in FIGS. 1 and 2. In the second preferred embodiment of the adjustment joint S1 the locking bolt S15 is arranged so as to lock the adjustment joint S1 by means of a thread S18 in the first adjustment part 511 and a thread S15d in the locking bolt S15, as shown in FIGS. 3 to 5. It is obvious that the thread S18 can be optionally located in the second adjustment element S12 so that the head S15b of the locking bolt S15 is located at the side of the first adjustment element S11. The locking bolt S15 advantageously serves simultaneously as an axle S14 traveling through the joint axis A1 and as a locking element S15. FIGS. 3 to 5 also show the cogs S26 of the second adjustment joint S2, its third adjustment part S23, arranged radially with respect to the joint axis A2 for stepwise adjustment. The second adjustment part S22 and adjustment joint S1 have corresponding cogs. The circles of coggings S26 and S16 are divided into 72 cogs T so that for coarse adjustment the position can be set stepwise at 5° steps.

Referring to FIGS. 3 to 5, it should be further noted that they show the lug S19 of only the second adjustment part S12 and the lug K1e of the fastening part K1 for the attachment of the fine adjustment elements F1. In addition, the adjustment joint S1 has, around axle S14, a guide sleeve S15a for the mutual concentration and guiding of adjustment parts S11, S12 and S13. In addition to this it should be noted that in the embodiment depicted, the rotary movement of the third adjustment element S13 around the joint axis A1 is restricted by the structure of the first adjustment part S11 attached to the fastening part K1, but the third adjustment part S13 may also be adapted such that it rotates freely around the joint axis A1, thus achieving a stepped adjustment range of ±180° for coarse adjustment.

The joint according to the invention is applied in the mechanical aiming of an antenna e.g. as follows. The direction for the aiming is first selected coarsely and the antenna is pointed to the target, typically another antenna, or to the desired direction using coarse adjustment, say by hand, and the locking mechanism is tightened for fine adjustment. The antenna is then aimed using fine adjustment with the help of a voltmeter, for example, for which an adequate adjustment range is needed. The position of the adjustment elements is locked by sufficiently tightening the locking mechanism. The locking mechanism is tightened to the desired torque value using preferably a torque spanner so as to lock the cone joint S17 to its position and to prevent the adjustment joint S1 from moving e.g. under the stress caused by wind or snow and ice. In the fine adjustment mode the locking force has to be such that the friction forces acting on the surfaces in question do not, however, prevent the sliding of the cone joint S17. The adjustment joint S1 can be switched between the coarse and fine adjustment modes advantageously by hand.

The present invention is not limited solely to the explanatory preferred embodiments described above but it can be modified within the scope of the claims attached hereto. For example, more than two adjustment joints can be fitted to the fastening elements and the axes of the joints can also be parallel. In addition, it is obvious that the attachment of the adjustment joints to a mounting flange or fastening elements as well as the attachment of two adjustment joints to each other can be arranged in many ways which, as such, are obvious to a person skilled in the art. In particular it should be noted that in addition to the aiming of radio link antennas the invention can be applied elsewhere where the position of objects to be fastened needs to be adjusted in conjunction with the fastening.

What is claimed is:

1. An adjustment joint for adjusting position comprising:
   at least two adjustment parts (S11, S12, S13, S21, S22, S23) rotatable with respect to each other around (arrow R) a joint axis (A1, A2); and
   a locking element (S14, S15, S15a, S15b, S15c, S15d) functioning in the direction (arrow L) of said joint axis (A1, A2) for locking the adjustment parts (S11, S12, S13, S21, S22, S23) into a locked state so that the adjustment parts become immobile with respect to each other, wherein:
   the adjustment joint (S1, S2) is configured so as to be switched from the locked state to a fine adjustment mode by opening the locking element (S14, S15, S15a, S15b, S15c, S15d);
   the adjustment joint (S1, S2) is configured so as to be switched from the fine adjustment mode to a coarse adjustment mode by further opening the locking element (S14, S15, S15a, S15b, S15c, S15d);

the adjustment joint (S1, S2) is configured so as to be switched from the coarse adjustment mode back to the fine adjustment mode and further from the fine adjustment mode to the locked state by tightening the locking element (S14, S15, S15a, S15b, S15c, S15d); and the adjustment joint is configured so that adjustments, if any, of the adjustment parts made in the fine adjustment mode and in the coarse adjustment mode are retained upon closing the locking element to cause the adjustment parts to be in the locked state.

2. The adjustment joint (S1, S2) according to claim 1, characterized in that the adjustment joint (S1, S2) comprises a first adjustment part (S11, S21) and second adjustment part (S12, S22), whereby in the coarse adjustment mode said adjustment parts (S12, S22) are arranged so as to be movable (arrow L) with respect to each other in the direction of the joint axis (A1, A2) and rotatable (arrow R) with respect to each other around the joint axis (A1, A2), and whereby in the fine adjustment mode said adjustment parts (S12, S22) are arranged so as to be rotatable with respect to each other around the joint axis (A1, A2) and movement of said adjustment parts (S12, S22) with respect to each other in the direction of the joint axis (A1, A2) is preferably prevented, a third adjustment part (S13, S23) is fitted between the first adjustment part (S11, S21) and second adjustment part (S12, S23), whereby in the coarse adjustment mode the third adjustment part (S13, S23) is arranged so as to be movable with respect to both the first (S11, S21) and the second (S12, S22) adjustment part in the direction of the joint axis (A1, A2) and rotatable around the joint axis (A1, A2), whereby in the fine adjustment mode the third adjustment part (S13, S23) is arranged so as to be rotatable with respect to the first adjustment part (S11, S21) around the joint axis (A1, A2) and movement of the third adjustment part (S13, S23) with respect to the second adjustment part (S12, S22) is preferably prevented.

3. The adjustment joint (S1, S2) according to claim 2, characterized in that the first adjustment part (S11, S21) and third adjustment part (S13, S23) are interconnected through a cone joint (S17, S17a, S17b) and that the second adjustment part (S12, S22) and third adjustment part (S13, S23) are interconnected through cogging (S16, S16a, S16b).

4. The adjustment joint (S1, S2) according to claim 2, characterized in that the fine adjustment mode the movement of the second adjustment part (S12, S22) and third adjustment part (S13, S23) with respect to each other in the direction of the joint axis (A1, A2) is prevented at least in such a manner that the stepwise rotation to the next position of the third adjustment part (S13, S23) with respect to the second adjustment part (S12, S22) is prevented.

5. The adjustment joint (S1, S2) according to claim 2, characterized in that the adjustment joint (S1, S2) is arranged so as to be switched from the coarse adjustment mode to the fine adjustment mode and further to the locked state by reducing the distance between the first adjustment part (S11, S21) and second adjustment part (S12, S22) by means of a locking element (S14, S15, S15a, S15b, S15c, S15d).

6. The adjustment joint (S1, S2) according to claim 1, characterized in that the adjustment joint (S1, S2) comprises an axle (S14) traveling through the joint axis (A1, A2) and functioning as locking elements (S14, S15, S15a, S15b, S15c, S15d), which axle (S14) is in the form of a bolt comprising a screw thread (S15d) and a head (S15b), said screw thread (S15d) being connected to one of a thread (S18) in a first adjustment part (S11, S21), a thread in a second adjustment part (S12, S22), and a nut (S15c) fitted in the adjustment joint (S1, S2).

7. The adjustment joint (S1, S2) according to claim 2, characterized in that the second adjustment part (S12, S22) is at least in the fine adjustment mode arranged so as to be rotatable with respect to the first adjustment part (S11, S21) around the joint axis (A1, A2) by means of a fine adjustment element (F1, F1a, F1b, F2, F2a, F2b, F2c, F2d, F2e, F2f).

8. The adjustment joint (S1, S2) according to claim 1, characterized in that the adjustment joint (S1, S2) is fitted to fastening elements (K, K1, K2) which are arranged for attaching objects and setting their positions, and that the fastening elements (K, K1, K2) also comprise a second adjustment joint (S1, S2) the joint axis (A1, A2) of which is adapted so as to be transverse with respect to the joint axis (A1, A2) of said adjustment joint (S1, S2).

9. Fastening elements for attaching objects and setting their positions, to which fastening elements (K, K1, K2) it is fitted at least one adjustment joint (S1, S2) for adjusting position, which adjustment joint (S1, S2) comprises at least two adjustment parts (S11, S12, S13, S21, S22, S23) arranged so as to be rotatable with respect to each other around (arrow R) a joint axis (A1, A2) and a locking element (S14, S15, S15a, S15b, S15c, S15d) arranged so as to function in the direction (arrow L) of said joint axis (A1, A2) for locking the adjustment parts (S11, S12, S13, S21, S22, S23) into a locked state so that the adjustment parts become immobile with respect to each other, wherein:

the adjustment joint (S1, S2) is configured so as to be switched from the locked state to a fine adjustment mode by opening the locking element (S14, S15, S15a, S15b, S15c, S15d);

the adjustment joint (S1, S2) is configured so as to be switched from the fine adjustment mode to a coarse adjustment mode by further opening the locking element (S14, S15, S15a, S15b, S15c, S15d);

the adjustment joint (S1, S2) is configured so as to be switched from the coarse adjustment mode back to the fine adjustment mode and further from the fine adjustment mode to the locked state by tightening the locking element (S14, S15, S15a, S15b, S15c, S15d);

fitted in connection with at least one adjustment joint (S1, S2) there are fine adjustment elements (F1, F1a, F1b, F2, F2a, F2b, F2c, F2d, F2e, F2f) for the adjustment of position of the adjustment joint (S1, S2) in the fine adjustment mode; and the adjustment joint is configured so that adjustments, if any, of the adjustment parts made in the fine adjustment mode and in the coarse adjustment mode are retained upon closing the locking element to cause the adjustment parts to be in the locked state.

10. Fastening elements (K, K1, K2) according to claim 9, characterized in that the fastening elements (K, K1, K2) comprise at least two adjustment joints (S1, S2) the joint axes (A1, A2) of which are adapted so as to be transverse with respect to each other.

11. A method of installation and setting of position of an adjustment joint, which adjustment joint (S1, S2) comprises at least two adjustment parts (S11, S12, S13, S21, S22, S23) rotatable with respect to each other around (arrow R) a joint axis (A1, A2), and a locking element (S14, S15, S15a, S15b, S15c, S15d) functioning in the direction (arrow L) of said joint axis (A1, A2) for locking the adjustment parts (S11, S12, S13, S21, S22, S23) into a locked state so that the adjustment parts become immobile with respect to each other, wherein:

the adjustment joint (S1, S2) is switched from the locked state to a fine adjustment mode by opening the locking element (S14, S15, S15a, S15b, S15c, S15d);

the adjustment joint (S1, S2) is switched from the fine adjustment mode to a coarse adjustment mode by further opening the locking element (S14, S15, S15a, S15b, S15c, S15d);

the adjustment joint (S1, S2) is switched from the coarse adjustment mode back to the fine adjustment mode and further from the fine adjustment mode to the locked state by tightening the locking element (S14, S15, S15a, S15b, S15c, S15d); and adjustments, if any, of the adjustment parts made in the fine adjustment mode and in the coarse adjustment mode are retained upon closing the locking element to cause the adjustment parts to be in the locked state.

12. The method according to claim 11, wherein the position is adjusted in the fine adjustment mode of the adjustment joint (S1, S2) by means of fine adjustment elements (F1, F1a, F1b, F2, F2a, F2b, F2c, F2d, F2e, F2f) that are fitted in connection with said adjustment joint (S1, S2).

13. The adjustment joint (S1, S2) according to claim 3, characterized in that the fine adjustment mode the movement of the second adjustment part (S12, S22) and third adjustment part (S13, S23) with respect to each other in the direction of the joint axis (A1, A2) is prevented at least in such a manner that the stepwise rotation to the next position of the third adjustment part (S13, S23) with respect to the second adjustment part (S12, S22) is prevented.

14. The adjustment joint (S1, S2) according to claim 3, characterized in that the adjustment joint (S1, S2) is arranged so as to be switched from the coarse adjustment mode to the fine adjustment mode and further to the locked state by reducing the distance between the first adjustment part (S11, S21) and second adjustment part (S12, S22) by means of a locking element (S14, S15, S15a, S15b, S15c, S15d).

15. The adjustment joint (S1, S2) according to claim 4, characterized in that the adjustment joint (S1, S2) is arranged so as to be switched from the coarse adjustment mode to the fine adjustment mode and further to the locked state by reducing the distance between the first adjustment part (S11, S21) and second adjustment part (S12, S22) by means of a locking element (S14, S15, S15a, S15b, S15c, S15d).

16. The adjustment joint (S1, S2) according to claim 2, characterized in that the adjustment joint (S1, S2) comprises an axle (S14) traveling through the joint axis (A1, A2) and functioning as locking element (S14, S15, S15a, S15b, S15c, S15d), which axle (S14) is in the form of a bolt comprising a screw thread (S15d) and a head (S15b), said screw thread (S15d) being connected to one of a thread (S18) in the first adjustment part (S1, S21), a thread in the second adjustment part (S12, S22), and a nut (S15c) fitted in the adjustment joint (S1, S2).

17. The adjustment joint (S1, S2) according to claim 3, characterized in that the adjustment joint (S1, S2) comprises an axle (S14) traveling through the joint axis (A1, A2) and functioning as locking element (S14, S15, S15a, S15b, S15c, S15d), which axle (S14) is in the form of a bolt comprising a screw thread (S15d) and a head (S15b), said screw thread (S15d) being connected to one of a thread (S18) in the first adjustment part (S11, S21), a thread in the second adjustment part (S12, S22), and a nut (S15c) fitted in the adjustment joint (S1, S2).

18. The adjustment joint (S1, S2) according to claim 4, characterized in that the adjustment joint (S1, S2) comprises an axle (S14) traveling through the joint axis (A1, A2) and functioning as locking element (S14, S15, S15a, S15b, S15c, S15d), which axle (S14) is in the form of a bolt comprising a screw thread (S15d) and a head (S15b), said screw thread (S15d) being connected to one of a thread (S18) in the first adjustment part (S11, S21), a thread in the second adjustment part (S12, S22), and a nut (S15c) fitted in the adjustment joint (S1, S2).

19. The adjustment joint (S1, S2) according to claim 5, characterized in that the adjustment joint (S1, S2) comprises an axle (S14) traveling through the joint axis (A1, A2) and functioning as locking element (S14, S15, S15a, S15b, S15c, S15d), which axle (S14) is in the form of a bolt comprising a screw thread (S15d) and a head (S15b), said screw thread (S15d) being connected to one of a thread (S18) in the first adjustment part (S11, S21), a thread in the second adjustment part (S12, S22), and a nut (S15c) fitted in the adjustment joint (S1, S2).

20. The adjustment joint (S1, S2) according to claim 7, characterized in that the fine adjustment element (F1, F1a, F1b, F2, F2a, F2b, F2c, F2d, F2e, F2f) is one of a fine adjustment rod, and a fine adjustment screw.

21. The adjustment joint (S1, S2) according to claim 3, characterized in that the second adjustment part (S12, S22) is at least in the fine adjustment mode arranged so as to be rotatable with respect to the first adjustment part (S11, S21) around the joint axis (A1, A2) by means of a fine adjustment element (F1, F1a, F1b, F2, F2a, F2b, F2c, F2d, F2e, F2f).

22. The adjustment joint (S1, S2) according to claim 4, characterized in that the second adjustment part (S12, S22) is at least in the fine adjustment mode arranged so as to be rotatable with respect to the first adjustment part (S11, S21) around the joint axis (A1, A2) by means of a fine adjustment element (F1, F1a, F1b, F2, F2a, F2b, F2c, F2d, F2e, F2f).

23. The adjustment joint (S1, S2) according to claim 5, characterized in that the second adjustment part (S12, S22) is at least in the fine adjustment mode arranged so as to be rotatable with respect to the first adjustment part (S11, S21) around the joint axis (A1, A2) by means of a fine adjustment element (F1, F1a, F1b, F2, F2a, F2b, F2c, F2d, F2e, F2f).

24. The adjustment joint (S1, S2) according to claim 6, characterized in that the second adjustment part (S12, S22) is at least in the fine adjustment mode arranged so as to be rotatable with respect to the first adjustment part (S11, S21) around the joint axis (A1, A2) by means of a fine adjustment element (F1, F1a, F1b, F2, F2a, F2b, F2c, F2d, F2e, F2f).

25. The adjustment joint (S1, S2) according to claim 2, characterized in that the adjustment joint (S1, S2) is fitted to fastening elements (K, K1, K2) which are arranged for attaching objects and setting their positions, and that the fastening elements (K, K1, K2) also comprise a second adjustment joint (S1, S2) the joint axis (A1, A2) of which is adapted so as to be transverse with respect to the joint axis (A1, A2) of said adjustment joint (S1, S2).

26. The adjustment joint (S1, S2) according to claim 3, characterized in that the adjustment joint (S1, S2) is fitted to fastening elements (K, K1, K2) which are arranged for attaching objects and setting their positions, and that the fastening elements (K, K1, K2) also comprise a second adjustment joint (S1, S2) the joint axis (A1, A2) of which is adapted so as to be transverse with respect to the joint axis (A1, A2) of said adjustment joint (S1, S2).

27. The adjustment joint (S1, S2) according to claim 4, characterized in that the adjustment joint (S1, S2) is fitted to fastening elements (K, K1, K2) which are arranged for attaching objects and setting their positions, and that the fastening elements (K, K1, K2) also comprise a second adjustment joint (S1, S2) the joint axis (A1, A2) of which is adapted so as to be transverse with respect to the joint axis (A1, A2) of said adjustment joint (S1, S2).

28. The adjustment joint (S1, S2) according to claim 5, characterized in that the adjustment joint (S1, S2) is fitted to fastening elements (K, K1, K2) which are arranged for attaching objects and setting their positions, and that the fastening elements (K, K1, K2) also comprise a second adjustment joint (S1, S2) the joint axis (A1, A2) of which is adapted so as to be transverse with respect to the joint axis (A1, A2) of said adjustment joint (S1, S2).

29. The adjustment joint (S1, S2) according to claim 6, characterized in that the adjustment joint (S1, S2) is fitted to fastening elements (K, K1, K2) which are arranged for attaching objects and setting their positions, and that the fastening elements (K, K1, K2) also comprise a second adjustment joint (S1, S2) the joint axis (A1, A2) of which is adapted so as to be transverse with respect to the joint axis (A1, A2) of said adjustment joint (S1, S2).

* * * * *